Patented Mar. 16, 1954

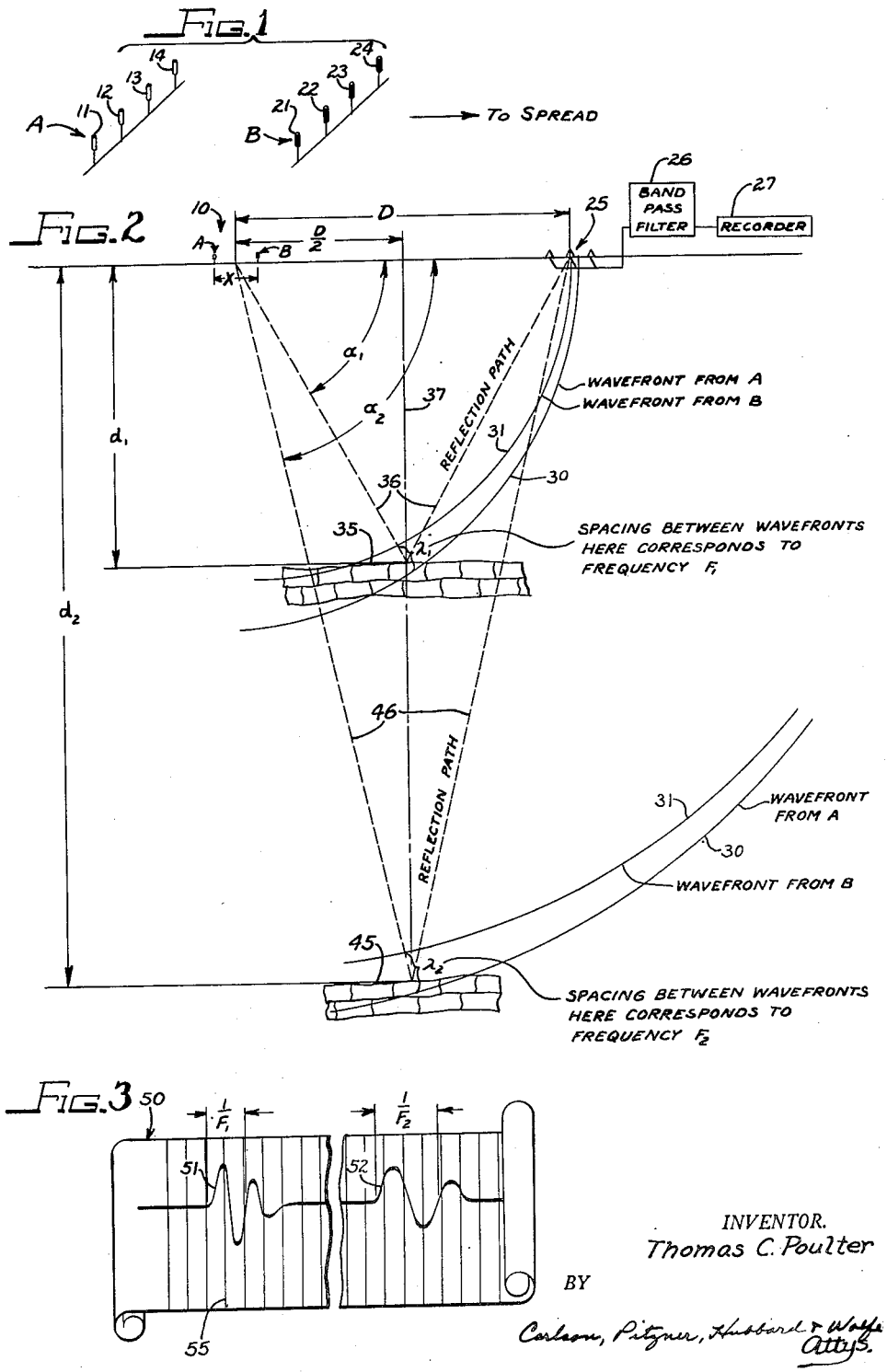

2,672,204

UNITED STATES PATENT OFFICE 2,672,204

METHOD AND APPARATUS FOR SEISMIC EXPLORATION

Thomas C. Poulter, Palo Alto, Calif., assignor to Institute of Inventive Research, San Antonio, Tex., a trust estate Application August 30, 1949, Serial No. 113,120

8 Claims. (Cl. 181—0.5)

The present invention relates to geophysical exploration and more particularly to the formation of an improved seismic wave for obtaining reflections from submerged horizons. It is a general object of the present invention to provide an improved method of arranging and firing a plurality of explosive charges so as to produce a seismic wave in the earth which is coordinated with the natural periods of earth vibration over two different reflection paths.

It is an object of the invention to provide a method of arranging and sequentially firing charges to direct a seismic wave of a certain frequency to a predetermined depth. It is a more specific object to provide a procedure for setting up a seismic wave in which different frequencies may be selectively projected to the depths at which waves of such frequencies are most readily reflected.

It is another object of the present invention to provide an array of air-fired charges for setting up wave fronts on the air over large but nevertheless well defined areas spaced from one another to generate in the earth a composite seismic wave and which permits the frequency thereof to be varied in accordance with the depth of the reflecting layer. It is a related object to provide an array of air-fired charges which includes two sequentially fired patterns for enabling more detailed analysis of submerged horizons whose presence is known or suspected as a result of data previously obtained. It is an object of the invention in one of its aspects to provide an array and procedure for using the same which efficiently penetrates the weathered layer and which enables any desired uniform distribution of frequency as a function of depth to be obtained.

Other objects and advantages of the invention will become apparent as the discussion proceeds taken in connection with the accompanying drawing in which:

Figure 1 shows an arrangement of air-fired explosive charges adapted for sequential firing in spaced groups in accordance with the present invention.

Fig. 2 is a diagrammatic elevation showing the projection of a wave of one frequency to a first reflecting horizon and a wave of another frequency to a second reflecting horizon by a single shot.

Fig. 3 shows diagrammatically a trace with two indicated reflections having different characteristic frequencies.

While the invention is susceptible of various modifications I have shown in the drawings and will herein describe in detail only certain embodiments of the invention; it is to be understood, however, that I do not intend to limit the invention by such disclosure but aim to cover all modifications and alternative charge arrays and methods of use falling within the spirit and scope of the invention as expressed in the appended claims.

It is generally known in geophysical exploration that the frequency of the energy returned from various levels may differ quite widely. For example, in the mid-continent areas the frequency of reflected energy coming in within one second will seldom contain frequencies lower than 45 vibrations per second and may range as high as 80 vibrations per second. However, the reflections appearing after a time interval greater than one second generally range from 35 to 60 vibrations. This amounts to a variation in frequency with depth in the ratio of 4:3. This ratio is found to hold even in areas which differ considerably from the mid-continent areas, such as that in the Gulf Coast region where the natural frequencies are, on the whole, much lower. It frequently happens, therefore, that a filter setting which obtains satisfactory reflections from deep horizons will exclude those from the shallower levels. This often results in the loss of valuable information and even where the phenomenon is detected to be present, separate shots and filter settings are required to obtain useable records from both depths. Nor does the use of separate filter settings solve this problem since the resulting shift in phase adds an additional element of uncertainty in interpreting the records.

In accordance with one of the aspects of the present invention, a method of arranging and sequentially firing explosive charges is disclosed herein which permits energy at one frequency to be projected to a certain depth and energy at a different frequency to be projected to some other predetermined depth by the firing of a single sequential shot. The nature of the wave permits a recording unit to be employed which is filtered to permit the passing of a wide band of frequencies enabling strong and clear reflections to be obtained on a single record from both depths.

The manner in which this is accomplished may be understood by referring to the drawing which shows an array of charges 10 employed for a single shot. This array includes a first pattern or group of charges A consisting of charges 11—14 and a second pattern B consisting of charges 21—24. The spread 25 is located at some distance from the array 10 and includes a number of conventional geophones together with a band pass filter 26 and a recorder or seismograph 27.

In practicing the invention the patterns A and B are spaced from one another in the direction of the spread so that they act on completely separate areas of the earth's surface and are fired with a short but predetermined interval between them. Under typical field conditions the patterns may be spaced apart a distance on the general order of 300 feet and A may be fired on the order of ten to forty milliseconds before B. The geophone spread will normally be located so that the mean or center-to-center distance between the array and the spread is about ten times the distance between the charges. It is found that such a setup causes a considerable difference between the frequencies projected, for purposes of reflection, to two different depths.

Prior to a more complete explanation of this phenomenon, and a discussion of the manner in which it can be usefully employed in accordance with the present invention, the mechanism of air-fired charges will be referred to very briefly. As set forth for example in my Patent No. 2,615,522 issued on October 28, 1952 the firing of a pattern of charges spaced a relatively short distance above the surface of the earth produces an expanding gas mass and a wave front which is applied to the earth flatly over a large area. With the charges spaced closely to one another, say on the order of twenty feet or less, the wave fronts from the individual charges react upon one another to produce a buildup of pressure between the charges and a disproportionately high average pressure over the area acted upon. The duration of the impact upon the earth is sufficiently short so that the atmospheric air blanket constitutes a temporary barrier to the gas tending to escape upwardly. The wave front applies a piston-like thrust to the earth over a large area and at relatively low intensity so that energy is transmitted thereto resulting in a seismic wave which is substantially flat and therefore directive in nature. In practicing the present invention I prefer to arrange the charges comprising each pattern in a line which is at right angles to the direction of the spread so that the wave front produced thereby is flat only in one direction and spreads out cylindrically from the strip of earth lying below the line of charges. In a typical case four charges may be used each having the form of a vertical cylinder of explosive weighing approximately one to ten pounds. The charges may be mounted on telescoping steel stakes capable of supporting the charges axially above the ground at "pole height," i. e., at an elevation falling within the range of approximately five to approximately fifteen feet. It has been found that the desired thrust may be obtained by using a greater elevation and spacing for large charges than for small.

Referring now to Fig. 2 the wave front set up by the pattern A, fired a short time ahead of pattern B, is indicated at 30 while the wave front set up by pattern B is indicated at 31. Assuming that a reflecting horizon is located at a depth $d_1$ as shown at 35, attention may be focused on those portions of the two wave fronts which are usefully reflected. One portion follows the path indicated generally at 36, the center point of the reflection lying on a generally vertical "depth line" 37 which is midway between the shot point and spread. The broad but fairly well defined area over which reflection takes place and surrounding the line 37 may be referred to, for any given setup, as the "region of interest." Upon receipt at the geophones the signal is transmitted in the form of an electrical impulse through the filter and recorded in the seismograph 27. Another portion of the successive wave fronts 30, 31 passes through the reflecting horizon 35 and into contact with a second reflecting horizon 45 located at a depth $d_2$. Reflection from the latter horizon takes place along the path 46 and evidences itself as a subsequent impulse on the seismograph trace. It will be noted in Fig. 2 that because of the offset between the pattern A and B the wave fronts 30, 31 are not concentric and the distance between them along any given radial element is determined by the downwardly angling of such element. Thus the spacing $\lambda_1$ at the reflecting horizon 35 differs from the spacing $\lambda_2$ at the second horizon 45. These wavelengths correspond to seismic frequencies $f_1$ and $f_2$ respectively. The wave fronts 30, 31 taken together may be considered as a composite wave in which the crest-to-crest distance and therefore frequency varies from point to point as a function of depth. The filter is normally adjusted to pass a band of frequencies which is sufficiently wide to include the frequencies $f_1$ and $f_2$ so that both reflections are recorded.

In practicing the invention the spacing between the charge patterns and the time interval between the firing thereof is coordinated in a novel manner with the depths which are of interest and with the center-to-center spacing between the charge array and the geophone spread. By a "depth of interest" is meant a depth at which the existence of a horizon is suspected or known at least approximately from data previously obtained in the region either by seismic techniques or by any other means. Normally seismic data is taken in the form of a continuous survey and the approximate depth of a horizon may be determined sufficiently accurately by visual observation of traces taken in adjacent regions or graphically by extrapolation. While it is true that the presence of abrupt anomalies such as faults will prevent the depth of a horizon from being accurately predictable, nevertheless, even a rough approximation will be sufficiently accurate for practical purposes. In the event that an approximation cannot be obtained from previous shots in the survey then a test shot may be fired at the shot point with the filter "wide open" to accept a wide band of frequencies. The test shot may be a single charge of several pounds of explosive fired in the air. This will provide indication on the record of the depth of actual or suspected horizons any two of which can be more clearly and accurately located by employing a particular firing interval and spacing between the patterns as discussed in the following paragraphs.

For convenience the spacing between the two patterns may be designated $x$, the center-to-center distance $D$, and the downward angling or angle of depression of the reflected portions of the waves $a_1$ and $a_2$ respectively. It can readily be shown that the spacing between two wave fronts traveling through a medium having a velocity of transmission $v$ will remain the same provided the direction of propagation of the two fronts is the same. While the direction of propagation of the wave fronts 30, 31 is not the same initially, it becomes almost exactly the same after the transmission to a depth corresponding to even a shallow reflecting horizon.

It follows from this that since the two wave fronts are traveling at the same speed and in the same direction, the time interval between the arrival at any point along a radial line from the charges will be the same. Consequently the frequency along the radial line constituting the first half of the reflection path must remain constant at a predetermined value. If it be assumed for present purposes that the velocity remains unchanged, then the wavelength between the two wave fronts will also remain constant at a value which we may designate as $a$. This makes it possible to obtain the desired spacing and firing interval simply and accurately by applying two conditions.

The first condition is that the charges are spaced a distance $x$ from one another and fired simultaneously. At a point considerably removed from the array it can be shown that the line satisfying the condition lies at an angle $\alpha$ given by the following expression:

$$\alpha = \cos^{-1} \frac{a}{x} \quad (1)$$

In terms of $a$ the distance between the wave fronts thus becomes $$a = x \cos \alpha \quad (2)$$

If, on the other hand, it is assumed that the two patterns are located at the same point and fired with an interval $T$ between them, then the spacing $a'$ between the wave fronts is given by the following expression:

$$a' = vT \quad (3)$$

where $v$ is the velocity of transmission.

But since the wavelength $\lambda$ between the two wave fronts is the result of both the spacing and the firing interval, then, from (2) and (3), $$\lambda = vT - x \cos \alpha \quad (4)$$

This is a general expression for any angle $\alpha$. For the two particular values shown in Fig. 2 this expression becomes $$\lambda_1 = vT - x \cos \alpha_1 \quad (5)$$

$$\lambda_2 = vT - x \cos \alpha_2 \quad (6)$$

Solving (5) and (6) simultaneously for $x$ we find that $$x = \frac{\lambda_2 - \lambda_1}{\cos \alpha_1 - \cos \alpha_2} \quad (7)$$

Solving the same expressions for the firing interval $T$, we find that $$T = \frac{\lambda_1 \cos \alpha_2 - \lambda_2 \cos \alpha_1}{v (\cos \alpha_2 - \cos \alpha_1)} \quad (8)$$

It is not necessary actually to know the angles $\alpha_1$ and $\alpha_2$ in order to determine $x$ and $T$ respectively under a given set of conditions. Since, upon inspection of Fig. 2, it will be noted that $$\tan \alpha_1 = \frac{d_1}{D/2} \quad (9)$$

then $$\cos \alpha_1 = \frac{D/2}{\sqrt{(D/2)^2 + d_1^2}} \quad (10)$$

Similarly, $$\cos \alpha_2 = \frac{D/2}{\sqrt{(D/2)^2 + d_2^2}} \quad (11)$$

Nor is it necessary to know the wavelengths $\lambda_1$ and $\lambda_2$ set forth in Fig. 2. For these we can insert the corresponding velocity-frequency ratios:

$$\lambda_1 = \frac{v}{f_1} \quad (12)$$

and $$\lambda_2 = \frac{v}{f_2} \quad (13)$$

Substituting Expressions 10 to 13 in 7 and 8 results in the following:

$$x = \frac{\frac{v}{f_2} - \frac{v}{f_1}}{\left(\frac{D/2}{\sqrt{(D/2)^2 + d_1^2}}\right) - \left(\frac{D/2}{\sqrt{(D/2)^2 + d_2^2}}\right)} \quad (14)$$

and $$T = \frac{\frac{1}{f_1}\left(\frac{D/2}{\sqrt{(D/2)^2 + d_2^2}}\right) - \frac{1}{f_2}\left(\frac{D/2}{\sqrt{(D/2)^2 + d_1^2}}\right)}{\left(\frac{D/2}{\sqrt{(D/2)^2 + d_2^2}}\right) - \left(\frac{D/2}{\sqrt{(D/2)^2 + d_1^2}}\right)} \quad (15)$$

To arrive at numerical values for the spacing $x$ and the firing interval $T$ it is necessary for values to be assigned to the parameters including the center-to-center distance $D$, the depths $d_1$, $d_2$, the frequencies $f_1$ and $f_2$ corresponding thereto, and the velocity $v$.

With regard to the center-to-center distance $D$ this may be any convenient amount depending upon the accuracy required for the survey. Generally this distance will be sufficiently great so that the reflection from the deepest horizon of interest will arrive ahead of the direct air wave from the air-fired charge. This condition is in most cases amply met using a distance $D$ of 2,000 feet although this may be doubled, if desired, without departing in any way from the invention.

The depths of interest $d_1$, $d_2$ may often be obtained from surveys previously made in the area, the prior traces showing the possibility of two reflecting horizons and the probable depths. Alternatively these depths may be obtained by extrapolating data obtained from an adjacent shot in the survey or by a test shot as previously mentioned. In the event that prior data indicates the existence of only a single horizon at a depth $d_1$, then approximate values may be assigned to $d_2$ and the corresponding frequency of the reflected wave $f_2$ based upon readings taken at some other point in the same region even though located quite remotely from the area being surveyed. The traces thus obtained will serve as a first approximation upon which a shot may be based, after which the values for the depths and frequencies of two reflections may be refined in accuracy to obtain revised values for $x$ and $T$ and a second shot made.

With regard to assigning values to the frequencies $f_1$ and $f_2$ of the reflected wave, reference is made to Fig. 3 which shows a seismogram 50 obtained from a test shot with the filter 26 adjusted to admit a wide band of frequencies. This trace includes a first energy impulse 51 and a second energy impulse 52. It will be understood that the record has been simplified for purposes of ready understanding and that it will normally include a number of traces each having spurious vibrations. Where the latter are present the existence of reflected energy is indicated by "alinement" of the various traces as readily understood by one skilled in the art. The vertical lines indicated at 55 are timing lines separated by a convenient interval, say, $1/100$ of a second. The first impulse 51 has a length of $1/f_1$ second and the second impulse a length of $1/f_2$ second. The values of $f_1$ and $f_2$ obtained by inversion are substituted in the Expressions 14 and 15.

The only thing that remains to be determined is the velocity in the region being studied. The latter may be obtained by employing conventional techniques in which a shallow shot is fired and picked up at a series of geophones alined with the shot and spaced at equal increments therefrom. The traces obtained from successive geophones will, of course, be offset from one another. The slope of the offset then serves as a convenient measure of the velocity. This slope may be obtained more accurately by plotting distance vs. arrival time at the successive geophones and measuring the slope of the curve connecting the points.

While it has been assumed in the foregoing discussion that the velocity $v$ is known and is constant over the paths taken by the reflections, one skilled in the art will undoubtedly recognize that this is not the case and that the velocity is much greater in a dense homogeneous medium such as rock than it is in loose granular structure as found, for example, in the weathered layer. It might appear on first impression that the variation in velocity with depth would considerably affect the accuracy of spacing and time interval obtainable upon employing the above expressions. Surprisingly enough it can be shown that where the "surface velocity" is employed for $v$, accurate results are obtainable in spite of the fact that the actual velocity of the reflected wave below the surface may be many times greater or less than this. This results from the fact that the characteristic frequency of the wave projected to a given depth remains constant over the reflection path regardless of whether the wave fronts are closely spaced as they would be when traveling through a low velocity medium, or widely spaced as when traveling through a high velocity medium. Stated another way the spacing between the wave fronts 30, 31 may be conveniently considered to represent time rather than distance.

Once values are assigned to the above parameters, Expressions 14 and 15 may be readily solved. Various short cuts can be worked out for accomplishing this solution including the use of tables in which portions of the expression have been worked out for various values of the parameters. In any event the solution may be accomplished in a matter of minutes and the setting up of the charges and the adjustment of the firing mechanism is not delayed. The firing interval may be set on any suitable interval timer, for example of the type in which a freely falling weight successively makes contact with two firing circuits.

The above-described array and firing procedure enables waves of different frequencies to be projected to selected depths; however, it is to be noted that a favorable condition is established for reception of reflections from horizons at intermediate depths as well as horizons lying on either side of the depths of interest. The reason for this is that the correlation of frequency with depth does not only apply at the two points of interest but a frequency-depth relationship is set up for the entire range of depth over which reflections are detectable by the measuring instruments.

Referring in greater detail to the band pass filter 26 it should preferably be of the type in which the band width is adjustable. In this way the filter can be run substantially "wide open" when making a test shot to determine the depths of interest and then narrowed down to pass a range of frequencies lying somewhat above and below the frequencies which are of interest. Thus the record may be kept free of the extremely high or extremely low frequencies while allowing admission of a maximum amount of useful energy.

While I prefer to use a series of charges in each of the patterns as shown in Fig. 1 it will be apparent to one skilled in the art that the invention is by no means limited to such arrangement. For example it would include an elongated charge stretched horizontally a short distance above the earth and formed either of interconnected lengths of high explosive in cylindrical form or of primacord. In its broadest aspect the invention would also include arrays in which each pattern consists of a single charge spaced and fired as outlined herein although the reflections under such circumstances will generally not be quite as satisfactory.

As in my copending applications on air-fired charges the present charge array and procedure for employing the same enables the usual shot hole drilling equipment and accessories to be entirely eliminated. This feature offers exceptional advantages in foreign countries as well as in other areas which are difficult to reach with heavy equipment. Since no drilling equipment is needed, the operating procedure is made more flexible and fast moving, and the shooting party can work more closely, or may even be combined, with the surveying party. If it is found that additional shot points are desired, they can be introduced without having each of the three groups return to that point. Several shots can be made at the same point with perfect reproducibility and without encountering what is known as hole fatigue wherein successive records differ widely even though identical charges are loaded in exactly the same manner in a shot hole.

Test shots made in cultivated areas show that very little permanent damage is incurred by the plant life on the surface immediately below the elevated charges. Experiments to date employing the techniques disclosed herein for underwater prospecting indicate that no damage to fish and marine life results from the energy set up in the water by detonating the charges suspended above the water by floating buoys. While the noise is somewhat greater than accompanies the firing of an equivalent amount of charge in the ground, nevertheless the possibility of damage to buildings and other structures is much less than that caused by the shear wave or "ground roll" in conventional shooting techniques.

From an economic standpoint the savings in time and cost to drill shot holes ahead of the seismograph crews, together with the elimination of the drilling and accessory equipment, and sharp reduction in the amount of explosive required, enable the cost per mile of subsurface information to be reduced substantially below that incurred in the past.

What I claim is:

1. A setup for seismic prospecting in areas where the most favorable frequency varies with depth comprising, in combination, a charge array and a geophone spread located remotely therefrom, said array and said geophone spread being arranged on opposite sides of a region of interest, said array including first and second patterns of explosive charges elevated a short distance above the ground and spaced from one another generally in alinement with the geophone spread at such spacing as to apply impulses to the ground over different respective areas, means for firing the patterns in sequence separated by a time interval, the spacing of the patterns and the time interval being so related to the depths of interest and to the mean separation of the patterns from the geophone spread as to cause a composite wave having the desired frequencies to intersect the respective depths at the region of interest, and recording means connected to said geophone spread and capable of receiving a band of frequencies which is sufficiently broad as to include said desired frequencies.

2. The method of seismic prospecting in areas where the most favorable frequency varies with depth which includes the steps of determining the characteristic frequencies of the seismic reflections respectively received from two different depths of interest, arranging first and second patterns of charges a short distance above the ground and spaced from one another generally in line with a geophone spread, and firing the patterns in sequence separated by a time interval, the pattern spacing being sufficiently great so that explosive impulses are applied to the ground over different respective areas and the time interval being so related to the depths and to the mean separation of the patterns from the geophone spread that the composite wave intersecting said depths at the region midway between the charge patterns and the geophone spread has the characteristic frequencies corresponding to said depths respectively.

3. The method of seismic prospecting which includes the steps of determining the characteristic frequencies of the seismic reflections received from two different depths of interest, arranging first and second patterns of charges a short distance above the ground and spaced from one another generally in line with a geophone spread, firing the patterns in sequence separated by a time interval, the pattern spacing being sufficiently great so that explosive impulses are applied to the ground over different respective areas and the time interval being so related to the depths and to the mean separation of the patterns from the geophone spread as to cause a composite wave of a desired frequency to intersect said depths at the region midway between the charge patterns and the geophone spread, and receiving a band of frequencies at the geophone spread which is sufficiently broad as to include the frequencies corresponding to both of the depths of interest.

4. The method of seismic prospecting which includes the steps of determining the characteristic frequencies of the seismic reflections received from two different depths of interest, arranging first and second lines of charges a short distance above the ground, said lines being spaced from one another in the direction of a geophone spread at such spacing as to cause an explosive impulse to be applied to the ground over different respective areas but with each line arranged perpendicular to the direction of the spread, firing the lines in sequence separated by a time interval, the spacing and the time interval being so related to the depths and to the mean separation of the lines from the geophone spread as to cause a wave of a desired frequency to intersect said depths at the submerged region midway between the charges and the geophone spread, and receiving at said spread reflections lying within a band of frequencies which includes the frequencies corresponding to both of said depths of interest.

5. The method of seismic prospecting in areas where the most favorable frequency varies with depth which includes the steps of determining the frequencies of the seismic reflections received from two different depths of interest, arranging first and second charges in the vicinity of the ground surface with the charges being free of any substantial obstruction to the passage of a shock wave downwardly therefrom, said charges being spaced from one another generally in line with a geophone spread at such spacing as to cause an explosive impulse to be applied to the ground over different respective areas, firing the charges in sequence separated by a time interval, the spacing and the time interval being so related to the depths and to the mean separation of the charges from the geophone spread as to cause a wave of a desired frequency to intersect said depths at the submerged region midway between the charges and the geophone spread, and receiving at said spread reflections lying within a band of frequencies which includes the frequencies corresponding to both of said depths of interest.

6. The method of seismic prospecting which includes the steps of determining the frequencies of seismic waves reflected from two different depths of interest, setting up first and second patterns of charges elevated a short distance above the ground and spaced from one another generally in alinement with a geophone spread, the spacing being given substantially by the following expression:

$$x = \frac{\frac{v}{f_2} - \frac{v}{f_1}}{\left(\frac{D/2}{\sqrt{(D/2)^2 + d_1^2}}\right) - \left(\frac{D/2}{\sqrt{(D/2)^2 + d_2^2}}\right)}$$

firing the patterns with the remote pattern being fired first and with the time interval between them given by $$T = \frac{\frac{l}{f_1}\left(\frac{D/2}{\sqrt{(D/2)^2 + d_2^2}}\right) - \frac{l}{f_2}\left(\frac{D/2}{\sqrt{(D/2)^2 + d_1^2}}\right)}{\left(\frac{D/2}{\sqrt{(D/2)^2 + d_2^2}} - \frac{D/2}{\sqrt{(D/2)^2 + d_1^2}}\right)}$$

where $x$ is the spacing between said first and second patterns, T is the time interval between firing of said first and second patterns, D is the spacing between the center points of the patterns and the geophone spread, $d_1$ and $d_2$ are the depths of interest, $f_1$ and $f_2$ are the frequencies of the waves reflected from the depths of interest, and $v$ is the velocity of propagation at the surface of the earth.

7. A setup for seismic prospecting for use in areas where the most favorable frequency varies with depth which comprises, in combination, a charge array and a geophone spread positioned on opposite sides of a submerged region of interest and substantially equidistant therefrom, said charge array having first and second rows of charges arranged at right angles to the direction of the spread, the charges in each of said rows being elevated at pole height and spaced sufficiently close together that upon simultaneous firing the gaseous products of detonation react together to apply a piston-like pressure impulse to the ground over the region lying generally below the charges, said rows of charges being laterally spaced from one another at such distance from one another as to apply pressure impulses to the ground over different respective areas, and means for firing the rows of charges in sequence, with the row of charges which is more remote from the geophones being fired first for the setting up of a seismic wave in the ground having a period which increases progressively with the angle of depression so that the seismic waves reflected from various depths each have a characteristic frequency, and a recording instrument including a band pass filter having an admission band sufficiently wide to receive the seismic impulses reflected from strata within a desired range of depth.

8. A setup for seismic prospecting for use in areas where the most favorable frequency varies with depth which comprises, in combination, a charge array and a geophone spread positioned on opposite sides of a submerged region of interest and substantially equidistant therefrom, said charge array having first and second patterns of charges spaced from one another in the direction of the spread, the charges in each of said patterns being elevated at pole height and spaced sufficiently close together that upon simultaneous firing a piston-like pressure impulse is applied to the ground over the region lying generally below the charge pattern, said patterns being spaced at such distance from one another as to apply impulses to the ground at different respective areas, and means for firing the patterns of charges in sequence separated by a time interval within the range of about 10 to about 40 milliseconds with the pattern of charges which is more remote from the geophones being fired first for the setting up of a seismic wave in the earth having a period which increases progressively with the angle of depression so that the seismic waves reflected from various depths each have a characteristic frequency, and a recording instrument including a band pass filter having a frequency admission band sufficiently wide to receive the seismic impulses reflected from strata within a predetermined range of depth.

THOMAS C. POULTER.

References Cited in the file of this patent

UNITED STATES PATENTS

| Number | Name | Date |
|---|---|---|
| 2,156,198 | Scherbatskoy | Apr. 25, 1939 |
| 2,259,478 | Morgan | Oct. 21, 1941 |
| 2,275,735 | Cloud | Mar. 10, 1942 |
| 2,377,903 | Rieber | June 12, 1945 |
| 2,378,925 | Hoskins et al. | June 26, 1945 |
| 2,580,636 | Wolf | Jan. 1, 1952 |

FOREIGN PATENTS

| Number | Country | Date |
|---|---|---|
| 701,747 | France | Mar. 21, 1931 |

OTHER REFERENCES

USSR "An Experiment of Air Explosions In Reflection Exploration." Article in Applied Geophysics, 1945, No. 1, pages 82–87.